United States Patent

[11] 3,566,777

| [72] | Inventor | Walter Koziol |
| | | Russell, Ill. |
| [21] | Appl. No. | 876,157 |
| [22] | Filed | Dec. 4, 1969 |
| [45] | Patented | Mar. 2, 1971 |
| [73] | Assignee | Charmglow Manufacturing Co. |
| | | Antioch, Ill. |
| | | Continuation of application Ser. No. 672,780, Oct. 4, 1967, now abandoned. |

[54] REMOVABLE CLOSURE MEMBER FOR BASKET
10 Claims, 5 Drawing Figs.

[52] U.S. Cl............................................ 99/427, 99/421
[51] Int. Cl............................................ A47j 43/18
[50] Field of Search........................................ 99/427, 443, 292, 349, 393, 397—98, 402, 421, 426, 450; 220/19, 55, 55 (H), 55 (K), 56, 57, 58, 59, 60, 30.6, 38.5; 292/19—20, 56, 60, 63, 87, 95, 109, 121, 161, 163

[56] References Cited
UNITED STATES PATENTS
| 442,758 | 12/1890 | Soden............................ | 292/19 |

FOREIGN PATENTS
| 87,599 | 7/1896 | Germany....................... | 292/161 |
| 893,619 | 10/1953 | Germany....................... | 99/349 |

Primary Examiner—Billy J. Wilhite
Assistant Examiner—Arthur O. Henderson
Attorney—Neil E. Hamilton ABSTRACT: A closure member for a wire type barbecue basket which is removably retained within the confines of the basket solely by means of stationary wire flanges at one side of the closure and movable wire type projections at the opposite side. The stationary flanges and the movable projections rest on the horizontally extending wires of the basket and the movable projection is designed to be positioned inwardly to permit the closure cover to be removed from within the confines of the basket.

Patented March 2, 1971

3,566,777

Inventor
Walter Koziol
By Neil E. Hamilton
Attorney 3,566,777

REMOVABLE CLOSURE MEMBER FOR BASKET

This is a continuation of application Ser. No. 672,780 filed Oct. 4, 1967, now abandoned.

This invention relates to a removable closure member which is constructed and arranged to fit within the confines of a container. More particularly, this invention relates to a removable wire type type cover member for removably positioning in a wire-type barbecue basket wherein the retention and removal of the cover is effected by movable wire projections.

Closure members for barbecue spit baskets are described in U.S. Pat. Nos. 2,839,989; 2,895,408 and 3,188,939. In U.S. Pat. No. 2,839,980 specially designed brackets are required to be secured inside a barbecue basket for engagement by a cover. A hinged type cover and side panel are described in U.S. Pat. No. 2,895,408. Turn-type fasteners for a cover are illustrated in U.S. Pat. No. 3,188,939. It will be recognized that brackets, hinges and turn-type fasteners require special tooling when fabricating a barbecue basket. Further, use of baskets having these types of constructions poses problems after prolonged use as baskets become bent and difficulties arise attempting to fit covers into brackets. Hinging and turning actions also pose problems either because of bending or rusting. There is nowhere in the prior art a simplified assembly wherein a cover member can be removably retained solely by means of a pivotal wire-type projection member which can be manipulated and the cover removed by a single grasp of a person's hand.

It is an object of the present invention to provide a novel closure arrangement for a basketlike container which is simple in construction and incorporates a minimum number of moving parts. It is another object of the present invention to provide a unique closure member for a wire-type basket which can be inserted or removed with a single-hand operation. It is still another object of this invention to provide a closure for a wire-type basket which can be engaged and disengaged without requiring hinges or turn-type fasteners. It is yet another object of the present invention to provide a combined basket and cover assembly which is securely held in the basket portion yet removable without movement of any portion of the basket portion. It is another object to provide a combined basket and cover member which does not require special tooling and is easily manufactured.

The foregoing objects are accomplished and the shortcomings of the prior art are overcome by the present removable basket closure member wherein the cover or closure member is constructed and arranged to fit within the confines of a tray member and has at least one stationary flange member projecting beyond the confines of the closure member to engage spaced passages in one of the wall members of the tray. The closure has at least one movable engageable projectable member adapted in its extended position to engage the spaced passages in the tray walls opposite to those engaged by the stationary flange member and is movable to a retracted position to permit insertion and removal of the closure from within the confines of the tray. Grasping means are integral with the projectable member to move same between the extended and retracted positions from a position remote from its engagement with the passages in the wall.

A better understanding of the present basket assembly will be accomplished by reference to the drawing wherein.

Figure 1:
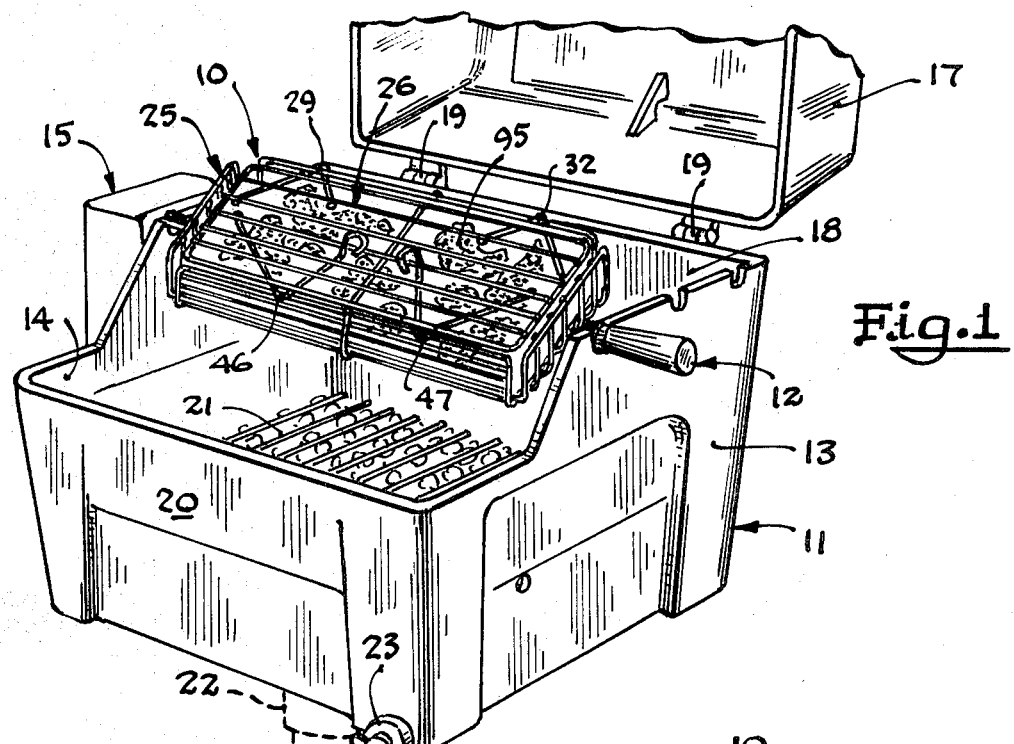
FIG. 1 is a perspective view of a barbecue unit operatively supporting a wire-type basket engaged by the present closure member.

Proceeding to a detailed description of the present invention, the basket generally 10 is rotatably supported in a barbecue unit generally 11 by means of a spit rod generally 12 which is rotatably supported in opposing end walls 13 and 14 of barbecue unit 11 and is rotated by electric motor generally 15. A cover 17 is hinged to back wall 18 of unit 11 by hinges 19, barbecue unit 11 further having a front wall 20 and a bottom wall upon which rests a grate 21 for a heating source such as porous stones or charcoal and being supported by post 22 through which gas is delivered to the unit to heat the stones or charcoal. The gas being controlled by control knob 23.

Basket 10 is formed from a tray portion 25 and a closure member 26, both formed from chrome-plated wire rods 27 which are welded together in a rectilinear manner. Closure 26 is composed of seven parallel wires 28 disposed longitudinally with the two outer wires being joined in one piece to form a rectangular border with the ends of the five intermediary wires welded to cross border wires 30 and 31. Two substantially V-shaped wire rod members 33 and 34 are welded with longer leg portions 35 and 36, respectively, welded to each of three longitudinally disposed wires 28 obliquely crossed by the leg portions in closure 26 and likewise shorter leg portions 37 and 38, respectively, are welded to two wires 28 which they cross. Wire members 33 and 34 extend a short distance beyond the periphery of closure 26 to provide V-shaped permanently extending flanges 29 and 32. Two additional substantially V-shaped wire rod members 39 and 40 extend obliquely across wires 28 and have only their one terminal portion securely welded to wires 28 as shown at 41, with their free ends formed in loop portions 42 and 43, respectively, for engagement with hand 44. When wire members 39 and 40 are in their extended position, as shown in solid lines, V-shaped movable flanges 46 and 47 extend beyond the periphery of closure 26 but they can be drawn inwardly to be within the confines of the closure as shown in broken lines. It will be noted in FIG. 2 that the two leg portions 50 and 51 of wire members 39 and 40, respectively, lie in the same plane beneath wires 28 with loops 42 and 43 being formed by bending the leg portions 50 and 51 at right angles to form a right angled portion 45 and to cause loops 42 and 43 to extend outwardly between and from wires 28 and to be engageable from the side opposite legs 50 and 51. For stability of the closure 26, a cross bar 52 is welded to wires 28.

Closure member 26 except for permanently extending flanges 29 and 32 and extending projectable flanges 46 and 47 is constructed and arranged to fit within the confines of tray portion 25 formed by bottom or end member 55, side members 56 and 57, and front and back wall members 59 and 60. Seven longitudinally extending wires 61 comprise the bottom or end 55 with one of the wires lying beneath rod 62 of spit rod 12 as viewed in FIG. 3A. Wires 61 are turned at right angles to form side retaining wall members 56 and 57 with peripheral wires 64 formed in one piece to extend across the outward ends of five inner wires such as at 65. Three U-shaped wires 67, 68 and 69 extend transversely across bottom wires 61 and at right angles at the sides of the bottom to form with five laterally extending spaced wires 70 at the front of tray 25, as viewed in FIG. 2, and five similarly disposed wires 71 at the back retaining wall members generally 72 and 73, respectively, with respective passages 75, 76 between wires 70 and 71. In a preferred manner, wires 67 and 69 are joined in a unitary manner by extending across bottom 55 and comprising the top wires 67a and 69a of front and back retaining members 72 and 73, the remaining four wires being welded to that portion of wires 67 and 69 between the top and bottom. It will be noted that the 10 wires 70 and 71 comprising front and back retaining members 72 and 73 are equally spaced with respect to each other to form spaced passages so that closure 26 lies in a plane parallel with bottom 55 when stationary flanges 29 and 32 rest between and on a given wire 71 from the top or bottom of the tray in back retaining member 73 and projectable flange members and 47 rest between and on a corresponding wire 70 in front retaining member 72.

Centrally secured at the ends of bottom 55 are thumb screw assemblies 80 with plates 81 welded to nonadjacent wires 61 having thumb screws 82 for pressing rod 62 against wires 67 and 69.

Figure 4:
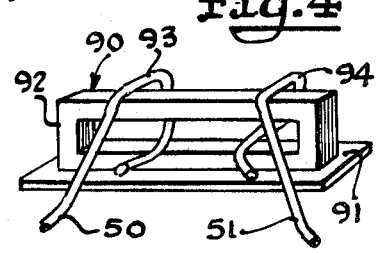
FIG. 4 is an alternative embodiment of a unitary means for reciprocal movement of the movable projecting member in the closure member.

In the alternative embodiment shown in FIG. 4, closure 26 is provided with a slide bar member generally 90 having a base plate 91 secured to a rectangularly slotted bar 92 through which loops 93 and 94 are loosely engaged for lateral displacement, loops 93, 94 being extensions of legs 50 and 51 of movable projecting wire members 39 and 40, respectively, with bar member 90 freely disposed on the outside of closure 26.

OPERATION

Figure 2:
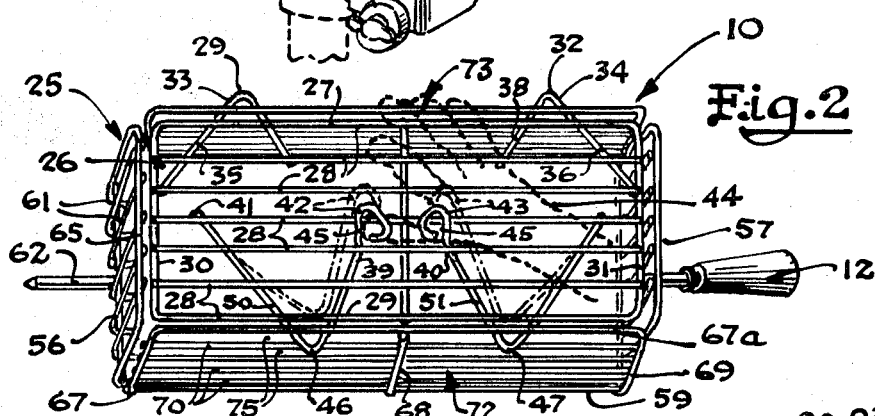
FIG. 2 is a perspective view of the combined basket and closure member engaged by a spit rod, the closure being manipulated by a hand.
Figure 3B:
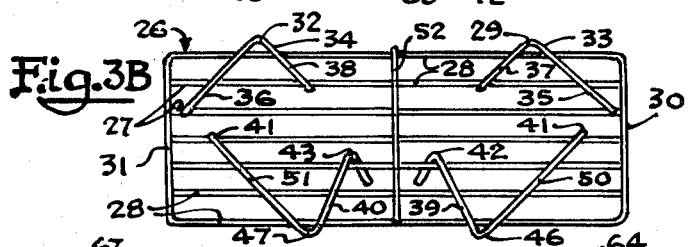
FIG. 3B is a bottom view of the closure member which is removed.
Figure 3A:
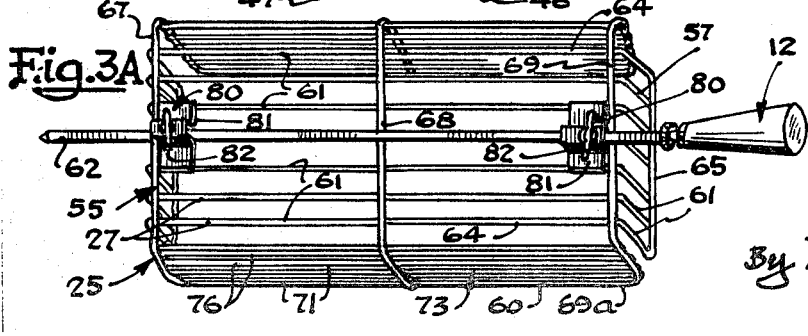
FIG. 3A is a bottom perspective view of the basket of FIG. 2

A better understanding of the advantages of closure cover 26 in basket tray 25 will be had by a description of its operation. Chicken pieces 95 will be placed in tray 25 with cover 26 removed and spit rod 12 disengaged from barbecue unit 11 as shown in FIG. 2. After tray 25 is filled with the desired number of chicken pieces, cover 26 will be placed in tray 25 at an angle and to a depth such that it slightly contacts the pieces with stationary flanges 29 and 32 being inserted between wires 71 comprising back retaining member 73 at the desired depth in passage 76. Loops 42 and 43 will then be grasped by the thumb of a hand 44 while fingers grasp the back of back retaining member 73 and by moving loops 42 and 43 inwardly toward back wall member 73, movable flanges 46 and 47 will be moved inwardly by a flexing of leg portions 50 and 51 of movable wire members 39 and 40, respectively, afforded by single welds 41 to a position inwardly of the periphery of closure 26 as shown in broken lines in FIG. 2 and by the arrow. The front portion of closure 26 is lowered until it contacts pieces 95 and is substantially parallel with bottom 55 at which point loops 42 and 43 are released from the grasp of hand 44 and movable projections 46 and 47 allowed to spring back to their normal resting position between wires 70 in front retaining member 72 and in passage 75 as shown in solid lines in FIG. 2. It will be noted that loops 42 and 43 provide for movement of projections 46 and 47 from a point away from passage 75 and that when loops 42 and 43 are moved inwardly across closure 26, they will have moved obliquely between two adjacent wires 28 but movement is restricted by the adjacent inward wire as loop portions 42 and 43 will contact same and thus facilitate the gripping of closure 26 with one hand during its insertion into tray 25. Lateral movement of closure 26 is prevented in tray 25 by wires 61 composing sidewalls 56 and 57 whereas front or back movement is restricted by wires 67, 68 and 69 forming front and back walls 72 and 73. Tray 25 is constructed and arranged so that contact between flanges 29, 32 and 46, 47 is afforded on wires 71 and 70, respectively, while closure 26 is retained as described between the front, back and sidewalls. To remove closure 26 from tray 25, the before described procedure is merely reversed.

Slide bar member 90 aids in the placement and displacement of closure 26 in tray 25 in the previously described manner by allowing a thumb to contact bar 92 between loops 93 and 94. As bar member 90 is moved inwardly toward back wall 73 and over the top of closure 26, loops 93 and 94 will move across bar 92 toward the ends of slot 96 and will move toward the center upon release of force.

Closure 26 is shown with two stationary flanges 29 and 32 and movable projections 46 and 47. However, any number of such flanges including a single stationary flange and a movably projectable flange can be employed and disposed in various positions on closure 26 on opposing sides. Alternatively, sidewall members 56 and 57 need not be formed from wires 61 extending in a plane transverse to the wires 70 and 71 forming front and back wall members 72 and 73 but can extend in a parallel plane or could be formed from solid panels.

The preferred material for wires 28, 30, 31, 33, 34, 39, 40, 52, 61, 67, 68, 69, 70 and 71 is chrome-plated or nickel-plated steel. However, any rigid or semirigid nonflammable materials can be employed to the extent that wires 39 and 40 do afford some flexing.

It will thus be seen that through the present invention there is now provided a novel removable closure for a basket which can be quickly and easily engaged and disengaged with a single hand operation. The closure member has a minimum of moving parts and is easily adapted to engage a basket without close tolerances. A simple construction is provided without special tooling and thus is easily and economically produced.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A combined basket and removable closure member comprising a basket defined by at least two retaining wall members provided with passages, a closure member constructed and arranged to fit within the confines of said retaining members, at least one first flange member projecting beyond the confines of said closure member to engage said passages in one of said retaining members and at least one movable engageable retractable member providing at least two contact surfaces from a single retractable member, said retractable member being flexible and adapted in its extended position to engage said passages in said other retaining member opposite to those engaged by said first flange member and movable to a retracted position within the confines of said retaining members to permit insertion and removal of said closure member from within the confines of said retaining members, means operatively connected to said retractable member to move said retractable member between said extended and retracted positions from a point away from the passages and means operatively associated with said means connected to said retractable member to stop movement of said retractable member away from said passages.

2. The removable closure as defined in claim 1 wherein said retaining members are formed from wire rods disposed to provide spaced passages for engagement by said first flange member and said retractable member.

3. The removable closure as defined in claim 1 wherein said basket is formed from end, side, back and front retaining members, said members formed from wire rods disposed to provide spaced passages for engagement by said first flange member and said retractable member and further includes fastening means on one of said members forming said basket to engage a rotatable spit rod.

4. The removable closure as defined in claim 1 wherein said retractable member and said means to move said retractable member is a unitary wire rod with a loop portion extending outwardly from said closure member.

5. The removable closure as defined in claim 4 including two of said retractable wire members with loop portions formed on said rod and spaced from said one retaining member to permit engagement with the fingers and thumb of a person's hand.

6. The removable closure as defined in claim 4 wherein two unitary wire rods form two said retractable members, said unitary rods being secured at one end to said closure member and a bar member interconnects said loop portions at a point opposite the attachment of said wires to provide simultaneous movement of both by a person's hand.

7. The removable closure as defined in claim 4 wherein said closure member is formed from spaced wire rods and said means to move said retractable member is operable between said spaced wire rods in said closure member.

8. The removable closure as defined in claim 7 wherein said spaced wire rods to form said closure member are substantially parallel and said means to move said retractable member moves obliquely therebetween.

9. The removable closure as defined in claim 8 wherein said means to move said retractable member and said retractable member as well as said first member are formed from wire rods and said first flange member is stationary.

10. The removable closure as defined in claim 9 wherein said basket is formed from end, side, front and back returning members, said members formed from wire rods and further includes means on one of said members forming said basket to engage a spit rod.